United States Patent [19]

Mochizuki

[11] Patent Number: 5,677,496
[45] Date of Patent: Oct. 14, 1997

[54] ELECTROMAGNETIC FLOW METER REMOVING INFLUENCE OF FLUCTUATION IN DIRECT-CURRENT OFFSET VOLTAGE

[75] Inventor: Tutomu Mochizuki, Okazaki, Japan

[73] Assignee: Aichi Tokei Denki Co., Ltd., Nagoya, Japan

[21] Appl. No.: 726,489

[22] Filed: Oct. 7, 1996

[30] Foreign Application Priority Data

Feb. 26, 1996 [JP] Japan .................................. 8-037849

[51] Int. Cl.$^6$ .................................................. G01F 1/00
[52] U.S. Cl. .................................. 73/861.17; 73/861.16; 73/601
[58] Field of Search .................... 73/861.12, 861.15, 73/861.16, 861.17

[56] References Cited

U.S. PATENT DOCUMENTS

| | | | |
|---|---|---|---|
| 4,206,641 | 6/1980 | Takada | 73/861.17 |
| 4,210,022 | 7/1980 | Boss | 73/861.17 |
| 4,856,345 | 8/1989 | Mochizuoki | 73/861.17 |
| 4,969,363 | 11/1990 | Mochizucki | 73/861.17 |
| 5,524,493 | 6/1996 | Yoshida | 73/861.16 |

FOREIGN PATENT DOCUMENTS

| | | | |
|---|---|---|---|
| 116220 | 9/1980 | Japan | 73/861.17 |
| 255620 | 10/1988 | Japan | 73/861.17 |
| A-5-312610 | of 1992 | Japan | 73/861.16 |
| WO 93/05367 | of 1993 | WIPO | 73/861.16 |

*Primary Examiner*—Ronald L. Biegel
*Attorney, Agent, or Firm*—Pollock, Vande Sande & Priddy

[57] ABSTRACT

An electromagnetic flow meter which calculates the electric conductivity of a fluid based on the ratio of an output signal generated when electrodes are grounded through short-circuit resistors $Rs_1$, $Rs_2$ to an output signal generated when the electrodes are not grounded, and more accurately corrects a flow measurement using the electric conductivity, characterized in that, for reducing measurement errors due to fluctuation in DC offset voltage accompanied by an on/off operation of the short-circuit switch S1, outputs are measured when the short-circuit switch S1 is on and off in a magnetization state, the output are next measured when the short-circuit switch S1 is on and off in a non-magnetization stage, and the outputs in the non-magnetization state are subtracted from the outputs in the magnetization state, thereby removing the influence of "DC offset voltage fluctuation" occurring accompanied by the on/off operation of the short-circuit switch S1.

2 Claims, 11 Drawing Sheets

ELECTROMAGNETIC FLOW METER REMOVING INFLUENCE OF FLUCTUATION IN DIRECT-CURRENT OFFSET VOLTAGE

BACKGROUND OF THE INVENTION

The present invention relates generally to an electromagnetic flow meter, and more particularly to an electromagnetic flow meter which removes the influence of fluctuation in a direct-current (DC) offset voltage.

The applicant has disclosed in JP-A-5-312610 improvements on an electromagnetic flow meter proposed in International Publication No. WO93-05367, wherein an electromagnetic flow meter having a short-circuit switch, for measuring electric conductivity, which intermittently connects electrodes for inducing a flow signal to a ground through short-circuit resistors, and an offset compensation circuit for removing a DC component in the flow signal, characterized in that the output of the offset compensation circuit immediately after the short-circuit switch for measuring electric conductivity is turned on and off is prohibited from being sampled as the flow signal.

The above-mentioned electromagnetic flow meter was intended to improve the accuracy of flow measurements by preventing an error due to a change in DC offset voltage component occurring when the short-circuit switch for measuring electric conductivity is turned on and off from introducing into a signal indicative of the result of a flow measurement.

FIG. 1 is a circuit diagram illustrating the electromagnetic flow meter of the prior art. The electromagnetic flow meter comprises a cylindrical flow pipe through which a fluid passes; electrodes 2a, 2b mounted on the inner wall of the flow pipe at opposite positions to each other for inducing a flow signal; and an earth electrode 2c, wherein the flow pipe 1, the electrodes 2a, 2b, the earth electrode 2c, and a magnetizing coil, not shown, constitute a detector of the electromagnetic flow meter which is well known in the art.

A short circuit used for measuring electric conductivity is composed of a series circuit comprising a short-circuit resistor $R_{S1}$ connected between the electrode 2a and the earth electrode 2c and the short-circuit switch S1 for measuring electric conductivity and a series circuit comprising a short-circuit resistor $R_{S2}$ connected between the electrode 2b and the earth electrode 2c and the short-circuit switch S1 for measuring electric conductivity.

A pre-amplifier A1 amplifies a voltage induced across the electrodes 2a, 2b. An offset compensation circuit 5 is composed of an inverting amplifier 51 with a gain of $-G$ comprising resistors Ra, Rb and an operational amplifier OP1 connected as illustrated; an integrator 52 having a resistor R1, a capacitor C1, and an operational amplifier OP2 connected as illustrated; and a switch S2.

The switch S2 and the short-circuit switch S1 are turned on and off in synchronism with a magnetizing current having a square waveform which is generated by a magnetizing coil, not shown.

A signal induced across the electrodes 2a, 2b, after amplified by the pre-amplifier A1, is supplied to the offset compensation circuit 5 for removing "fluctuation in DC voltage". The offset compensation circuit 5 is essential because the electronic circuit is more likely to be saturated when the DC voltage is larger.

When the short-circuit switch S1 in FIG. 1 is turned on and off at the timing shown in a waveform chart of FIG. 2-(B), a change in the offset voltage occurs between the electrodes 2a, 2b as illustrated in the waveform of FIG. 2-(A). The influence of level differences indicated by labels $\delta 2$ and $\delta 1$ in FIG. 2-(A) cannot be removed by the offset compensation circuit 5 in FIG. 1.

To solve this problem, the prior art technique disclosed in JP-A-5-312610 does not sample (in other words, used) the output of the offset compensation circuit as a flow signal immediately after the short-circuit switch S1 is turned off and turned on in order to avoid the adverse influence of the level differences.

This prior art technique can remove the influence of the level differences $\delta 2$ and $\delta 1$ as illustrated in FIG. 2-(A). In addition, the prior art technique can also remove the influence of "DC offset voltage fluctuation", if it is regarded as linear, as illustrated in FIG. 2-(A).

In the prior art technique mentioned above, the DC offset voltage, after the short-circuit switch S1 is turned off, fluctuates in such a manner that a level difference $\delta 2$ occurs, and thereafter the offset voltage continues to increase exponentially, not linearly, as illustrated in FIG. 3-(A). It takes a predetermined time, for example, 30 seconds or more after the short-circuit switch S1 has been turned off that the increase in the offset voltage can be practically regarded as linear.

Also, the magnitude of the "DC offset voltage fluctuation" changes over time. Specifically, in addition to the level difference $\delta 2$ which becomes larger each time the short-circuit switch S1 is turned off, the exponential increase in the offset voltage also becomes larger during a later off period of the short-circuit switch S1. In other words, the level difference $\delta 2$ becomes larger immediately after the short-circuit switch S1 is turned off, and the gradient of the exponential increase of the offset voltage also tends to increase from a curve $\alpha$ to a curve $\beta$, as illustrated in FIG. 4, due to the influences of aging changes and foreign substances possibly attached on the electrodes 2a, 2b, and so on.

As illustrated in FIG. 3, after the short-circuit switch S1 is turned on, a level difference $\delta 1$ occurs in the offset voltage, and the offset voltage tends to substantially converge to a fixed value after it presents a slight decrease for a short time period.

In the prior art technique as described above, the offset compensation circuit 5 can remove the adverse influence of a linearly increasing DC offset voltage, but not the adverse influence of the DC offset voltage which continuously presents an exponentially change.

The reason for the inability of the offset compensation circuit 5 to remove the adverse influence of the exponentially changing DC offset voltage will be described in detail with reference to FIG. 1 and waveform charts of FIG. 5.

FIG. 5-(A) illustrates an ideal square-wave input signal supplied to the offset compensation circuit 5; FIG. 5-(B) illustrates the timing of turning on and off the switch S2; and FIG. 5-(C) illustrates an output signal of the offset compensation circuit 5 when the input signal of FIG. 5-(A) is supplied thereto.

Since the signal of FIG. 5-(A) is assumed to be free from noise and DC offset voltage and the switch S2 is off during a period T1, a peak value E1 of the square-wave input is amplified by a predetermined amplification ratio in the inverting amplifier 51, and outputted from the offset compensation circuit 5 as having a level $-V1$, as illustrated in FIG. 5-(C).

During a period T2 in which the switch S2 is on, the output of the inverting. amplifier 51 is integrated by the integrator 52. Since an output of the integrator 52 is connected to a non-inverting input of the operational amplifier OP1 constituting the inverting amplifier 51, a feedback operation is performed so as to lead the output of the inverting amplifier 51 to zero. This feedback operation is a basic compensation operation performed by the offset compensation circuit 5. With the compensation operation, the output of the offset compensation circuit 5 reaches V2 at time t2. The ratio of V2 to the foregoing V1 (V2/V1) is given by:

$$V2/V1 = \epsilon^{-(1+G) \cdot T2/C1 \cdot R1}$$

where G=Rb/Ra.

Simultaneously with the switch S2 being turned off at time t2, the polarity of the input signal to the offset compensation circuit 5 is inverted. Similarly to the operation during the period T1, the input signal is amplified to generate an output value V3 which is held for a period T3.

During the period T3, the switch S2 is off and the output of the integrator 52 maintains a fixed value, so that a changing portion of the input to the offset compensation circuit 5 at time t2 is multiplied by −G in the inverting amplifier 51.

When the switch S2 is turned on at time t3, the compensation operation acts to reduce the output V3 of the inverting amplifier 51 to zero, and the output of the inverting amplifier 51 is reduced to V4 at the end time t4 of a period T4. In this case, the ratio of V4 to V3 (V4/V3) is given by:

$$V4/V3 = \epsilon^{-(1+G) \cdot T4/C1 \cdot R1}$$

During one cycle of the offset compensation circuit 5, the above described operations are performed.

Next described is the operation of the offset compensation circuit 5 when a DC offset voltage linearly changes.

FIG. 5-(D) illustrates a DC offset voltage linearly changing in a decreasing direction, and FIG. 5-(E) illustrates the output of the offset compensation circuit 5 generated when the DC offset voltage changes as illustrated in FIG. 5-(D). During the period T1, the switch S2 is off, and a changing portion of the input waveform of FIG. 5-(D) is multiplied by −G so that the output of the offset compensation circuit 5 reaches Va1 at time t1. When the switch S2 is turned on at time t1, the compensation operation acts to reduce the output to zero. At the end time t2 of the period T2, the output is reduced to Vb1.

A decrease in the input during the next period T3 is equal to a changing portion of the input in the minus direction during the period T1. This changing portion is amplified by the same amplification ratio as that in the period T1 in the inverting amplifier 51, whereby the output of the offset compensation circuit 5 reaches Va2. In this event, Va2=Va1 is satisfied.

During the period T4, since the switch S2 is on, the compensation operation acts to reduce the output to zero, whereby the output of the offset compensation circuit 5 is reduced to Vb2 at time t4. Likewise, in this event, Vb2=Vb1 is satisfied.

A sampling circuit 61 at a subsequent stage samples an area m1 during the period T2 and an area m2 during the period T4 to generate $m_1 - m_2$ as an output signal Vo.

In this event, since Va1=Va2 and Vb1=Vb2 are satisfied and the output waveform of the offset compensation circuit 5 has the same gradient during the periods T2 and T4, as illustrated in FIG. 5-(E), $m_1 = m_2$ is satisfied, and the output signal Vo is given by:

$$Vo = m_1 - m_2 = 0$$

In this way, when the DC offset voltage linearly changes in the decreasing direction as illustrated in FIG. 5-(D), the offset compensation circuit 5 can remove its influence.

Next, FIG. 5-(G) illustrates an output waveform of the offset compensation circuit 5 when a DC offset voltage exponentially changes in the decreasing direction as illustrated in FIG. 5-(F).

During the period T1, a changing portion of the input waveform illustrated in FIG. 5-(F) during the period T1 is multiplied by −G in the inverting amplifier 51, and the output of the offset compensation circuit is increased to Vc1 at time t1. When the switch S2 is on during the next period T2, the compensation operation acts to reduce the output of the offset compensation circuit 5 to zero, whereby the output is reduced to Vd1 at time t2. During the next period T3, since the switch S2 is off again, a changing portion of the input during the period T3 is multiplied by −G, and the output of the offset compensation circuit 5 is increased to Vc2 at time t3.

Since the change in the input is exponentially decreasing as illustrated in FIG. 5-(F), a changing amount of the input during the period T3 is smaller than the changing amount of the same during the period T1, so that Vc2 is smaller than Vc1.

Also, the Vd2 compensated to approximately zero by the compensation operation during the period T4 is of course smaller than Vd1.

The gradually decreasing areas in FIG. 5-(G) corresponding to the periods T2, T4 are sampled by the sampling circuit 61.

Assuming that the areas are labelled $Mg_1$, $Mg_2$, respectively, it is apparent that $Mg_1$ is smaller than $Mg_2$. The output Vo is given by:

$$Vo = Mg_1 - Mg_2$$

The output Vo is not reduced to zero.

In summary, when the input includes an exponential fluctuation as illustrated in FIG. 5-(F), its influence cannot be removed by the offset compensation circuit 5.

The foregoing description clearly indicates that the prior art technique disclosed in JP-A-5-312610 cannot remove the influence of the "DC offset voltage fluctuation".

SUMMARY OF THE INVENTION

It is therefore an object of the present invention to provide an electromagnetic flow meter which is capable of removing the influence of an exponentially changing DC offset voltage to accomplish accurate measurements of a flow rate and electric conductivity of a fluid.

To achieve the above object, an electromagnetic flow meter according to a first aspect of the present invention comprises a short-circuit switch (S1) disposed between a pair of electrodes (2a, 2b) and an earth electrode (2c) for performing an on/off operation, wherein an output generated when the short-circuit switch (S1) is turned off to operate a pre-amplifier (A1) in a high input impedance state is used as a flow signal, and the electric conductivity of a fluid is calculated based on the ratio of an output generated when the short-circuit switch (S1) is turned on to operate the pre-amplifier (A1) in a low input impedance state to the output generated in the high input impedance state, characterized by, generating the outputs when the short-circuit switch (S1) is on and off in a magnetization state, subsequently generating the outputs when the short-circuit switch (S1) is on and off in a non-magnetization state, subtracting the outputs in the non-magnetization state from the outputs in the magnetization state to remove the influence of fluctuation in "DC offset voltage fluctuation" occurring to the accompaniment of an on/off operation of the short-circuit switch (S1).

A second aspect of the present invention is characterized in that a signal in the first cycle after the short-circuit switch S1 is turned on or off is removed, and a signal in the second cycle is sampled as a target signal.

A signal generated across the electrodes during a magnetization period includes both of a flow signal and the influence of "DC offset voltage fluctuation". On the other hand, an output generated during a non-magnetization period only includes the influence of "DC offset voltage fluctuation" without the flow signal. By subtracting the output during a non-magnetization period from the output during a magnetization period, the influence of "DC offset voltage fluctuation" is canceled, thus making it possible to only extract an effective signal proportional to a flow rate.

Also, even if the "DC offset voltage fluctuation" increases over time, the outputs generated in adjacent periods with a slight time difference therebetween are subjected to the subtraction, the influence of the increase in the "DC offset voltage fluctuation" can be removed.

The effective signal derived by the subtraction includes a flow signal as a normal electromagnetic flow meter in a high input impedance state with the short-circuit switch (S1) being off, and information for calculating the electric conductivity of a fluid in a low input impedance state with the short-circuit switch (S1) being on. Even if the magnitude of the "DC offset voltage fluctuation" increases due to the influence of foreign substances attached to the electrodes or the like, it is possible to correctly make measurements of not only a flow rate but also the electric conductivity of a fluid.

DESCRIPTION OF THE PREFERRED EMBODIMENTS

Figure 6:
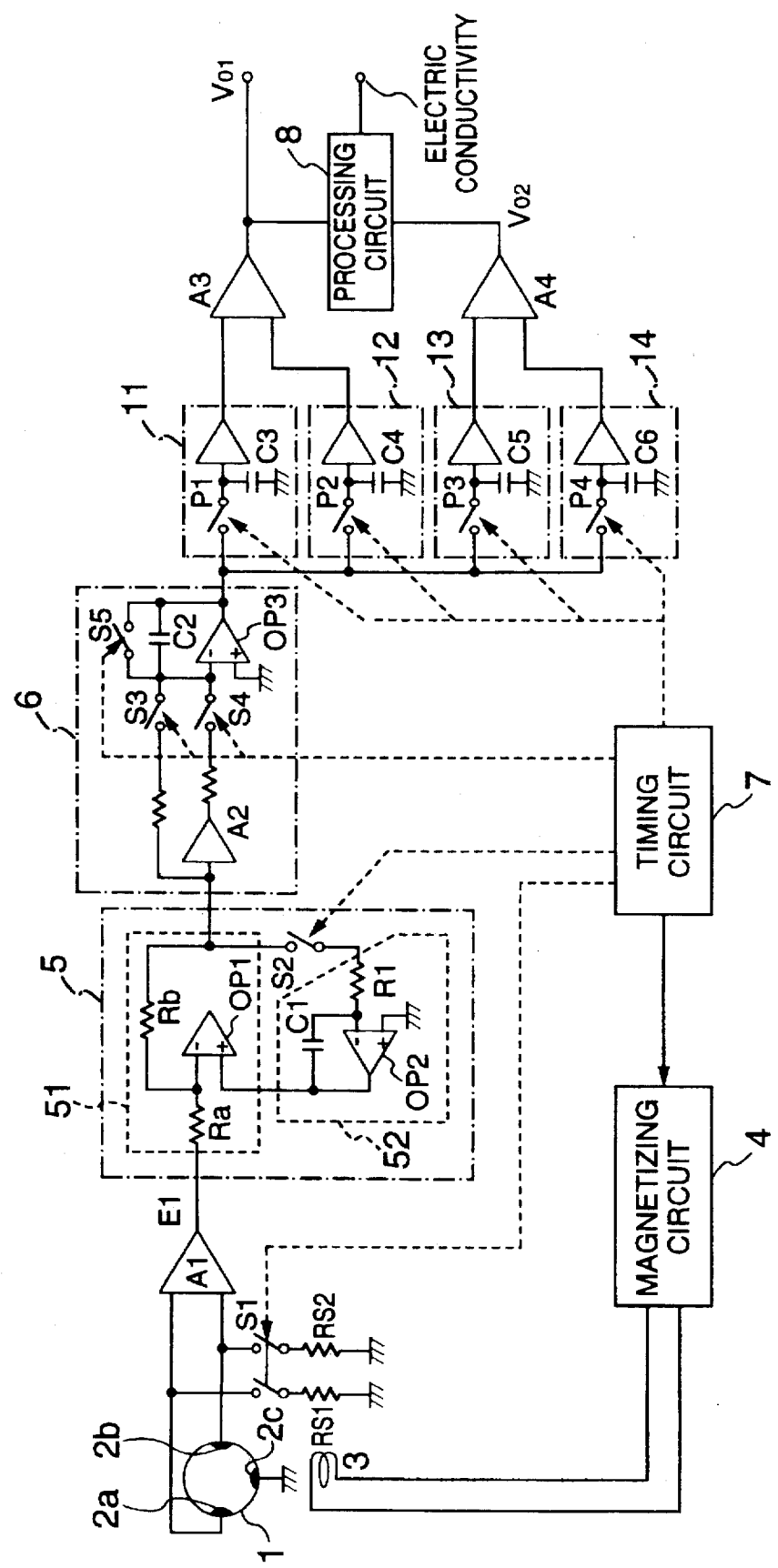
FIG. 6 is a block diagram illustrating an electromagnetic flow meter according to a first embodiment of the present invention.

FIG. 6 illustrates an electromagnetic flow meter according to the preferred embodiment of the present invention. The electromagnetic flow meter comprises a cylindrical flow pipe 1 through which a fluid passes; a pair of electrodes 2a, 2b mounted on the inner wall of the flow pipe 1 at positions opposite to each other for extracting an induced flow signal; an earth electrode 2c for grounding a fluid under measurement, which is connected to a common potential of a convertor in the electromagnetic flow meter; a magnetizing coil 3; and a magnetizing circuit 4 for supplying the magnetizing coil 3 with a magnetizing current.

The electrodes 2a, 2b are connected to differential inputs of a pre-amplifier A1 having a high input impedance, and are connected to and disconnected from the common potential through a series connection of a short-circuit resistor $R_{S1}$ and a short-circuit switch S1 and a series connection of a short-circuit resistor $R_{S2}$ and the short-circuit switch S1, respectively.

An output E1 of the pre-amplifier A1, after a direct-current (DC) offset voltage is removed therefrom by an offset compensation circuit 5, is sampled by a sampling circuit 6 which integrates an input signal only during a predetermined period, and connected to four holding circuits 11, 12, 13, 14 for holding a sampled output every sampling period.

The offset compensation circuit 5 is composed of an inverting amplifier 51 having resistors Ra, Rb and an operational amplifier OP1 connected as illustrated; an integrator 52 having a resistor R1, a capacitor C1, and an operational amplifier OP2 connected as illustrated; and a switch S2 operated in synchronism with the short-circuit switch S1 connected as illustrated.

The sampling circuit 6 is composed of an inverting amplifier A2 having a gain of −1, switches S3, S4, S5, a capacitor C3, an operational amplifier OP3, and two resistors, not labelled, connected as illustrated.

The holding circuit 11 is composed of a switch P1, a capacitor C3, and an amplifier, not labelled, connected as illustrated. The holding circuit 12 is composed of a switch P2, a capacitor C4, and an amplifier, not labelled, connected as illustrated. The holding circuit 13 is composed of a switch P3, a capacitor C5, and an amplifier, not labelled, connected as illustrated. The holding circuit 14 is composed of a switch P4, a capacitor C6, and an amplifier, not labelled, connected as illustrated.

A differential amplifier A3 is supplied with outputs of the holding circuit 11 and the holding circuit 12, and outputs a flow signal $Vo_1$. A differential amplifier A4 is supplied with outputs of the holding circuit 13 and the holding circuit 14, and delivers an output $Vo_2$ when the short-circuit switch S1 is turned on.

A processing circuit 8 calculates the electric conductivity of a fluid under measurement from the ratio of the flow signal $Vo_1$, which is the output of the differential amplifier A3, to the output $Vo_2$ of the differential amplifier A4, and outputs the calculated electric conductivity.

A timing circuit 7 supplies the magnetizing circuit 4 with a timing signal, turns on and off the short-circuit switch S1 and the switches S2, S3, S4, S5 at predetermined timing, respectively, and turns on the respective switches P1–P4 of the four holding circuits 11–14 at predetermined timing to hold the output of the sampling circuit 6 on the capacitors C3–C6, respectively.

The amplifiers, not labelled, connected to the capacitors C3–C6 constituting the respective holding circuits 11–14 for holding the output of the sampling circuit 6 are buffer amplifiers having a high input impedance.

Figure 7:
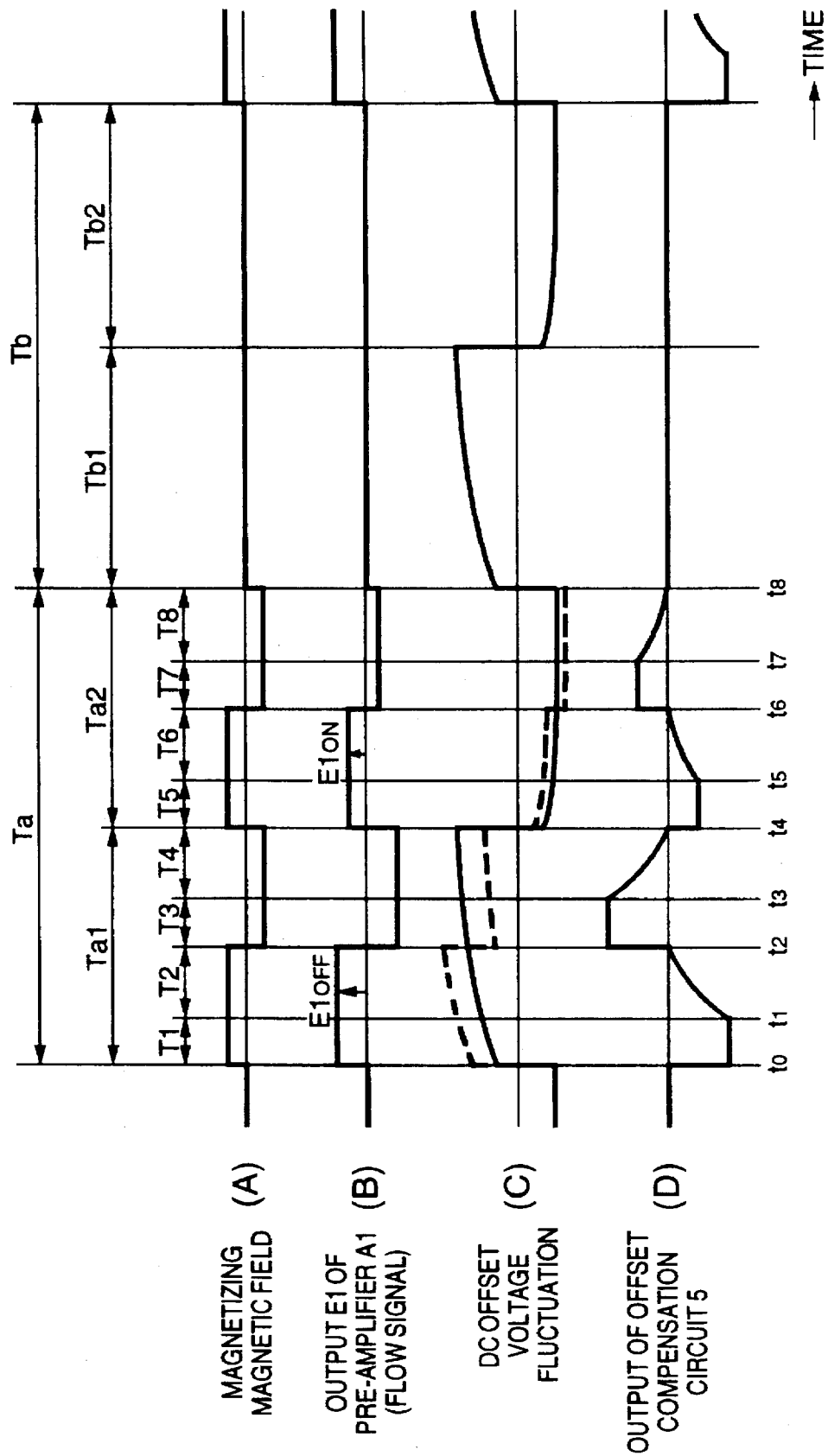
FIG. 7 is a waveform chart showing the operation timing of the electromagnetic flow meter illustrated in FIG. 6.
Figure 8:
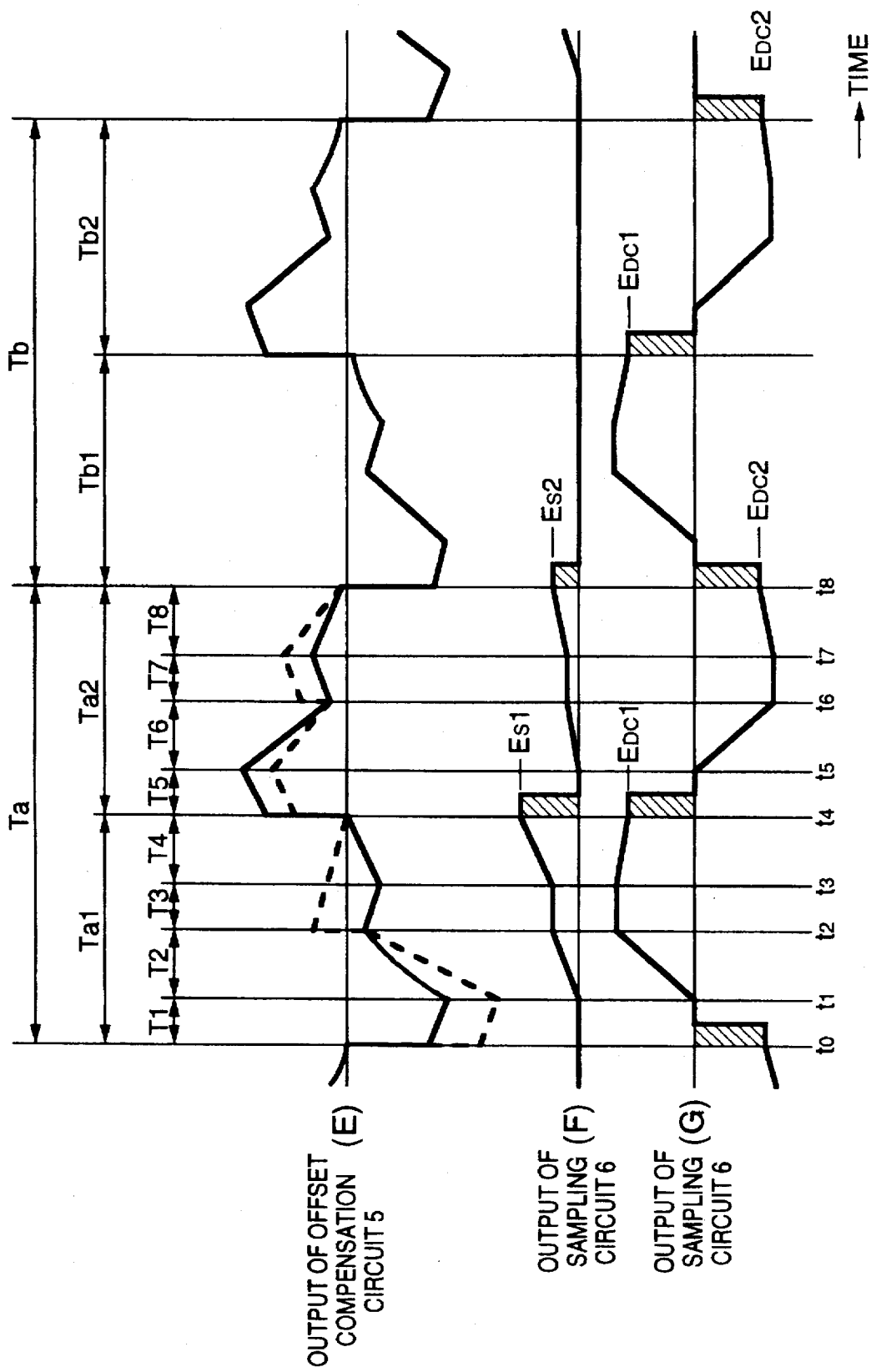
FIG. 8 is a waveform chart showing the operation timing of the electromagnetic flow meter illustrated in FIG. 6.
Figure 9:
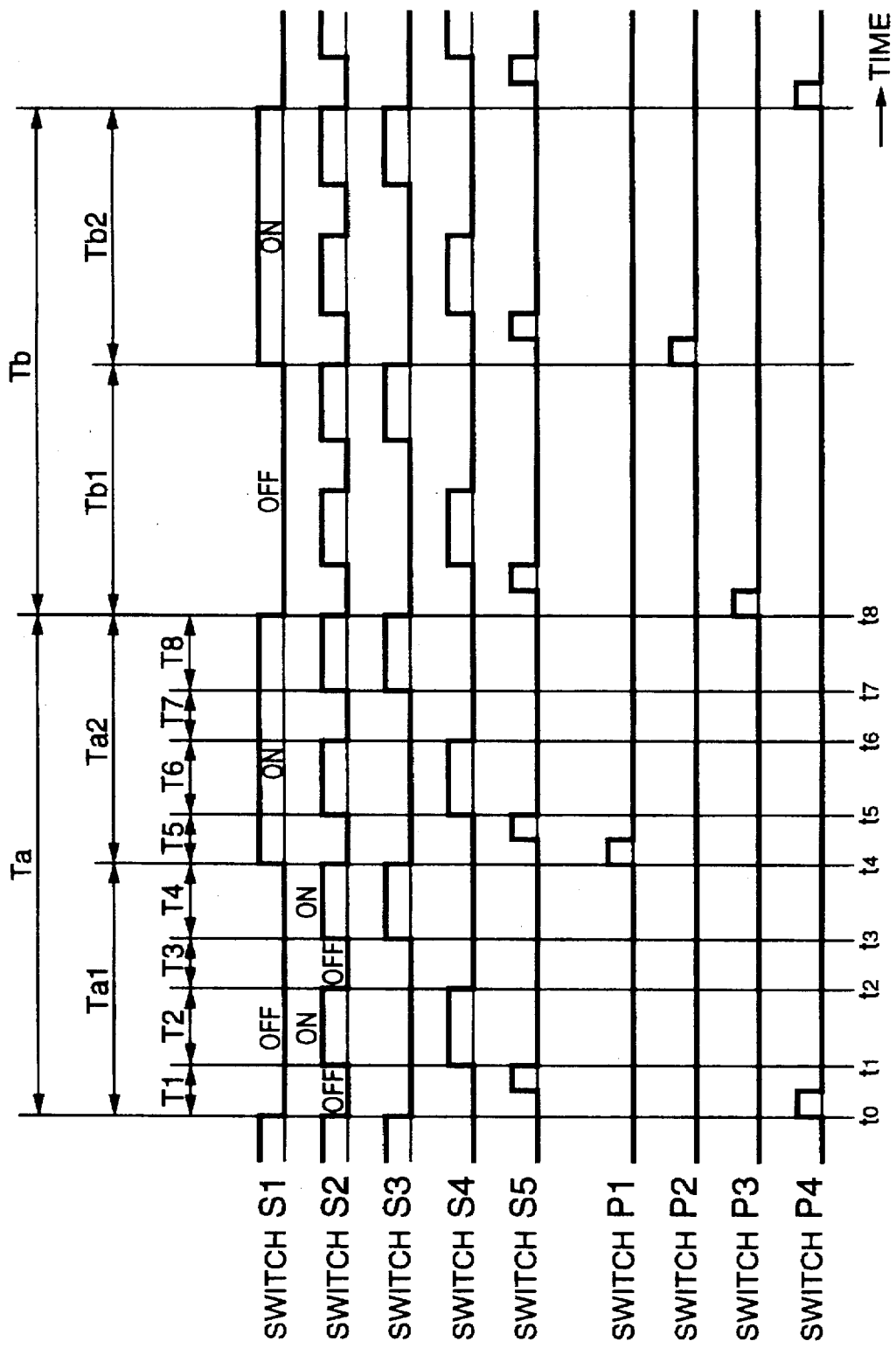
FIG. 9 is a waveform chart showing the operation timing of the electromagnetic flow meter illustrated in FIG. 6.

FIGS. 7–9 are waveform and timing charts showing the operations of the respective circuits in the electromagnetic flow meter of FIG. 6.

FIG. 7-(A) is a waveform representing a magnetic field produced by a magnetizing signal, wherein two cycles of square-wave magnetization are applied in a period Ta, followed by a non-magnetization period Tb having the same length (time) as a period Ta.

The period Ta consists of a total of two cycles of magnetization periods, i.e., a cycle Ta1 in which the short-circuit switch S1 is in off state and a cycle Ta2 in which the short-circuit switch S1 is in on state (FIG. 9).

The period Tb differs from the period Ta only in that the magnetizing magnetic field is removed, with other conditions in the period Tb equal to those in the period Ta. Specifically, the short-circuit switch S1 is off during a first cycle Tb1 of the magnetization and on during a second cycle Tb2 of the magnetization, subsequent to the cycle Tb1.

In this embodiment, the cycles Ta1, Ta2, Tb1, Tb2 are all determined to have the same length.

A signal proportional to a flow velocity of a fluid is generated across the electrodes 2a, 2b in FIG. 6 by the action of the magnetizing magnetic field as represented by FIG. 7-(A), and amplified by the pre-amplifier A1 to produce the output E1 illustrated in FIG. 7-(B).

During the period Ta1, the short-circuit switch S1 is off so that the pre-amplifier A1 has a high input impedance. The value $E1_{OFF}$ of the output E1 generated during the period Ta1 is a signal proportional to a flow rate.

During the period Ta2, the short-circuit switch S1 is on, and the inputs to the pre-amplifier A1 are grounded through the short-circuit resistors $R_{S1}$, $R_{S2}$ to present a low input impedance, so that the pre-amplifier A1 generates the output E1 having the value $E1_{ON}$ which is smaller than the value $E1_{OFF}$ generated during the period Ta1.

One object of the present invention is to accurately calculate the electric conductivity of a fluid under measurement from the ratio of the outputs $E1_{OFF}$ and $E1_{ON}$.

The above described is the operation of the electromagnetic flow meter performed during the former period Ta. Since a non-magnetization condition is present during the latter period Tb, the signal proportional to a flow rate is not generated.

FIG. 7-(B) illustrates the flow proportional signal generated across the electrodes 2a, 2b, i.e., the output signal of the pre-amplifier A1 during the periods Ta, Tb. A solid line in FIG. 7-(C) represents "DC offset voltage fluctuation" $V_{DC}$ generated by turning on and off the short-circuit switch S1.

The "DC offset voltage fluctuation" $V_{DC}$ presents completely the same waveform during the magnetization period Ta and during the non-magnetization period Tb. This is because the "DC offset voltage fluctuation" $V_{DC}$ results only from an electrochemical balance between the electrodes 2a, 2b and the earth electrode 2c and a fluid by the on/off operation of the short-circuit switch S1, and is not related to the presence or absence of the magnetizing magnetic field.

A broken line in the period Ta in FIG. 7-(C) illustrates the DC offset voltage fluctuation $V_{DC}$ multiplexed with the flow signal of FIG. 7-(B). The signal actually generated across the electrodes 2a, 2b. i.e., the output of the pre-amplifier A1 has a waveform represented by the broken line in the period Ta and the solid line in the period Tb in FIG. 7-(C).

FIG. 7-(D) illustrates an output waveform of the offset compensation circuit 5 in FIG. 6, which is generated when the flow proportional signal of FIG. 7-(B) is supplied thereto.

Figure 1:
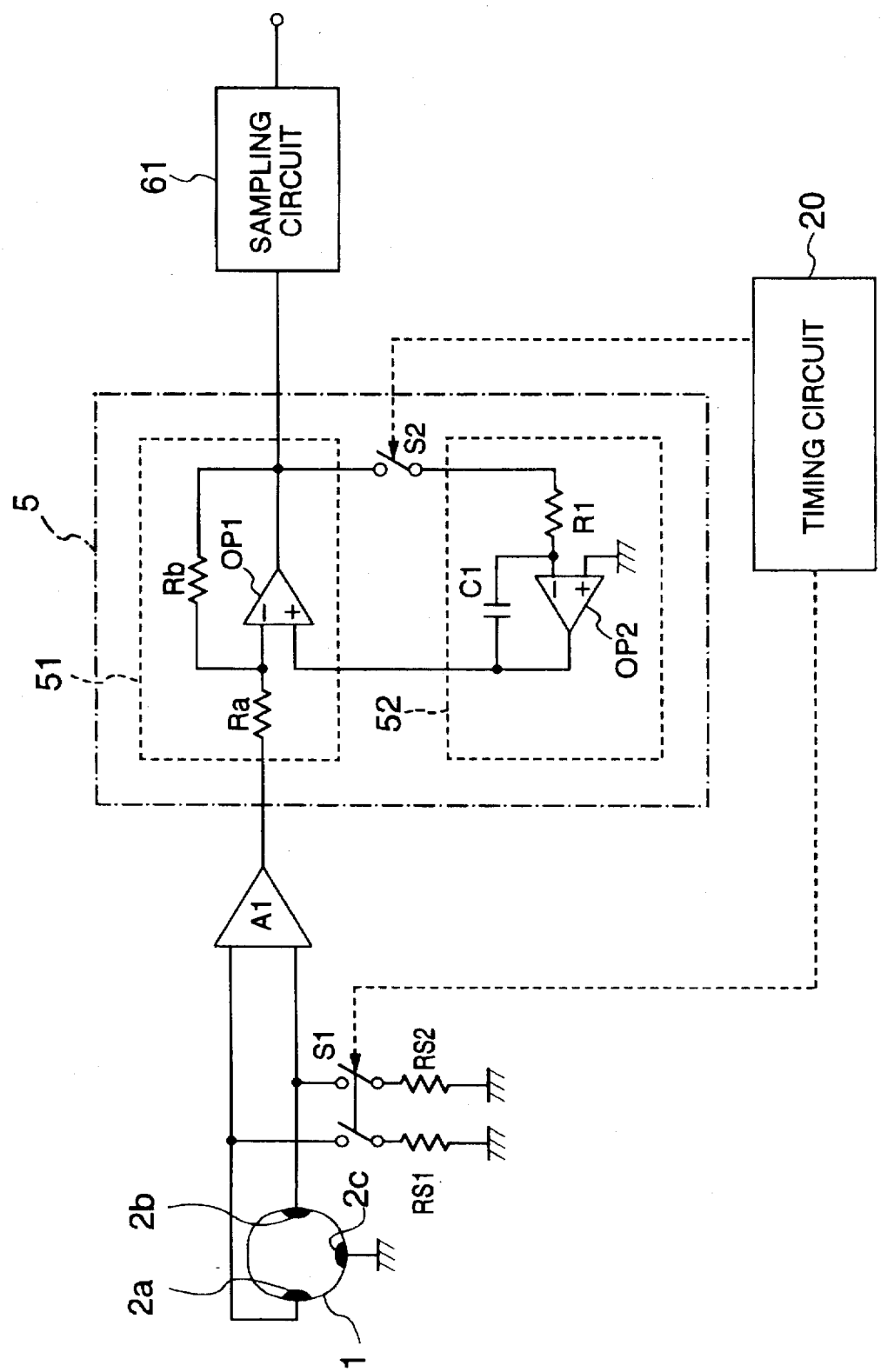
FIG. 1 is a block diagram illustrating a conventional electromagnetic flow meter.
Figure 2:
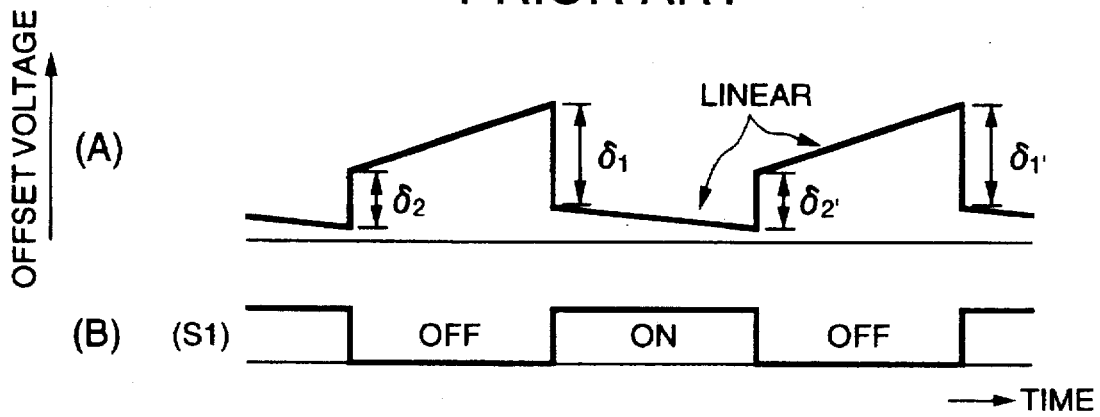
FIG. 2 is a waveform chart showing the relationship between an offset voltage (A) and on/off states of a short-circuit switch of the electromagnetic flow meter illustrated in FIG. 1.

The offset compensation circuit 5 of FIG. 6 has the same configuration as the prior art offset compensation circuit 5 described with reference to FIG. 1. As is also described above, since the switch S2 is off during the period T1 as illustrated in FIG. 9, when the switch S2 is turned on at the beginning of the period T2 after an input to the offset compensation circuit 5 is amplified by –G, a compensation operation acts to lead the output of the offset compensation circuit 5 to zero. Subsequently during periods T3–T8, the input is amplified as previously described.

A solid line in FIG. 8-(E) represents the output of the offset compensation circuit 5 generated when the "DC offset voltage fluctuation" represented by the solid line in FIG. 7-(C) is applied thereto.

During the period T1 in which the switch S2 is off, input fluctuation in the positive direction represented by the solid line in FIG. 7-(C) is multiplied by –G. Since the switch S2 is on during the next period T2, the compensation operation acts to lead the output of the offset compensation circuit 5 to zero. However, since the input represented by the solid line in FIG. 7-(C) continues to exponentially increase through the period T2, the output is led to zero at a slightly lower speed. Since the switch S2 is off again during the next period T3, an increase of the input in the positive direction only is multiplied by –G, so that the output of the offset compensation circuit 5 increases in the negative direction. Then, when the switch S2 is on again during a period T4, the compensation operation acts to lead the output to zero.

At the beginning time t4 of a period T5, the input represented by the solid line in FIG. 7-(C) changes with an instantaneous level difference in the negative direction, and then exponentially increases in the negative direction over time. Since the input is multiplied by –G, the output of the offset compensation circuit 5 presents positive values during the period T5. Subsequently during periods T6–T8, the offset compensation circuit 5 performs similar operations to those during the periods T2–T4.

Since the "DC offset voltage fluctuation" has the same waveform in the non-magnetization period Tb as in the period Ta, the output waveform of the offset compensation circuit 5 in the period Tb is also the same as the output waveform in the period Ta.

A broken line shown only in the period Ta in FIG. 8-(E) represents the output waveform multiplexed with the output waveform of. FIG. 7-(D) corresponding to the flow proportional signal. Therefore, the broken line in the period Ta and the solid line in the period Tb in FIG. 8-(E) represent the actual output waveform of the offset compensation circuit 5, which indicates that the DC offset voltage is multiplexed with the flow proportional signal.

FIG. 8-(F) illustrates an output waveform of the sampling circuit 6 in FIG. 6 which is generated when the flow signal of FIG. 7-(D) is supplied thereto. In this example, a sampling period of the sampling circuit 6 is assumed to have the same time length as the on-period of the switch S2. The flow proportional signal of FIG. 7-(D) passes through the inverting amplifier A2 having a gain of –1, and is integrated while the switch s4 is on during the period T2 as illustrated in the timing chart of FIG. 9. Thereafter, while the switch S3 is on during the period T4 as illustrated in the timing chart of FIG. 9, the flow proportional signal is directly integrated without passing through the amplifier A2. In this way, the sampling circuit 6 generates an output ES1 at the end of the period Ta1 (FIG. 8-(F)).

Similarly, the flow proportional signal passes through the inverting amplifier A2 and integrated during the period T6 in which the switch S4 is on as illustrated in the timing chart of FIG. 9, and subsequently integrated during the period T8 in which the switch S3 is on as illustrated in the timing chart of FIG. 9. In this way, the sampling circuit 6 generates an output Es2 at the end of the period Ta2 (FIG. 8-(F)).

The outputs $Es_1$ and $Es_2$ are outputs proportional to the flow signal. On the other hand, the flow signal presents a zero-value during non-magnetization periods Tb1, Tb2.

FIG. 8-(G) illustrates the output of the sampling circuit 6 corresponding to the "DC offset voltage fluctuation" $V_{DC}$ represented by the solid line in FIG. 8-(E). The "DC offset voltage fluctuation signal" $V_{DC}$ is sampled similarly to the flow signal. The sampling circuit 6 generates outputs $E_Dc1$, $E_Dc2$ corresponding to the periods Ta1, Ta2, respectively, and also generates the same outputs $E_Dc1$, $E_Dc2$ corresponding to the periods Tb1, Tb2 in the non-magnetization period Tb as the outputs corresponding to the periods Ta1, Ta2. The respective outputs $Es_1$, $Es_2$, $E_Dc1$, $E_Dc2$ are reset respectively at the timing at which the switch S5 is turned on as illustrated in the timing chart of FIG. 9.

The actual output of the sampling circuit 6 corresponding to the period Ta1 is the sum of $Es_1$ and $E_Dc1$ which is held in the holding circuit 11 in FIG. 6 at the timing of the switch P1 illustrated in FIG. 9. The actual output of the sampling circuit 6 corresponding to the period Tb1 is only $E_Dc1$ which is held in the holding circuit 12 at the timing of the switch P2 illustrated in FIG. 9. Subsequently, the differential amplifier A3 calculates the following subtraction:

$$Vo_1=(Es_1+E_Dc1)-E_Dc1=Es_1$$

wherein $Es_1+E_Dc1$ is the output of the sampling circuit 6 in the period Ta1, and $E_Dc1$ is the output in the period Tb1.

This subtraction removes the influence of the "DC offset voltage fluctuation" to only leave the net flow proportional signal Es1.

The flow proportional signal $Es_1$, i.e., $Vo_1$ is the output signal of the electromagnetic flow meter when the short-circuit switch S1 is in off state, and is the same as an output signal of a common electromagnetic flow meter which does not have the short-circuit switch S1 and the short-circuit resistors $Rs_1$, $Rs_2$.

The output signal of the sampling circuit 6 corresponding to the period Ta2 is $Es_2+E_Dc2$ which is held in the holding circuit 13 at the timing of the switch P3 illustrated in FIG. 9. The output signal of the sampling circuit 6 corresponding to the period Tb2 is only $E_Dc2$ which is held in the holding circuit 14 at the timing of the switch P4 illustrated in FIG. 9. Then, the differential amplifier A4 calculates the following subtraction similarly to the above:

$$Vo_2=(Es_2+E_Dc2)-E_Dc2=Es_2$$

where $Es_2+E_Dc2$ is the output of the sampling circuit 6 in the period Ta2, and $E_Dc2$ is the output in the period Tb2.

In this way, the influence of the "DC offset voltage fluctuation" is removed to only leave the flow proportional signal $Es_2$. This flow proportional signal $Es_2$, i.e., $Vo_2$ is the output signal of the sampling circuit 6 when the short-circuit switch S1 is on, i.e., when the pre-amplifier A1 presents a low input impedance, and serves as information for calculating the electric conductivity of a fluid under measurement (hereinafter referred to as the "electric conductivity information").

The output $Vo_1$ (=$Es_1$) of the differential amplifier A3 may be converted into a current output ranging from 4 to 20 mA by a voltage-to-current convertor, not shown, or displayed as an accumulated value of a flow under measurement by an accumulation display.

The output $Vo_2$ is utilized to calculate the electric conductivity of the fluid under measurement together with the output $Vo_1$ in the processing circuit 8. The electric conductivity of the fluid thus calculated may be outputted to the outside as an electric conductivity signal or utilized to correct errors possibly introduced into the flow signal due to changes in the electric conductivity to provide more accurate flow measurements.

It should be noted that the embodiment so far described with reference to FIGS. 6–9 is intended to explain the basic principles of the present invention, and several problems are still left unsolved for practical use.

Figure 13:
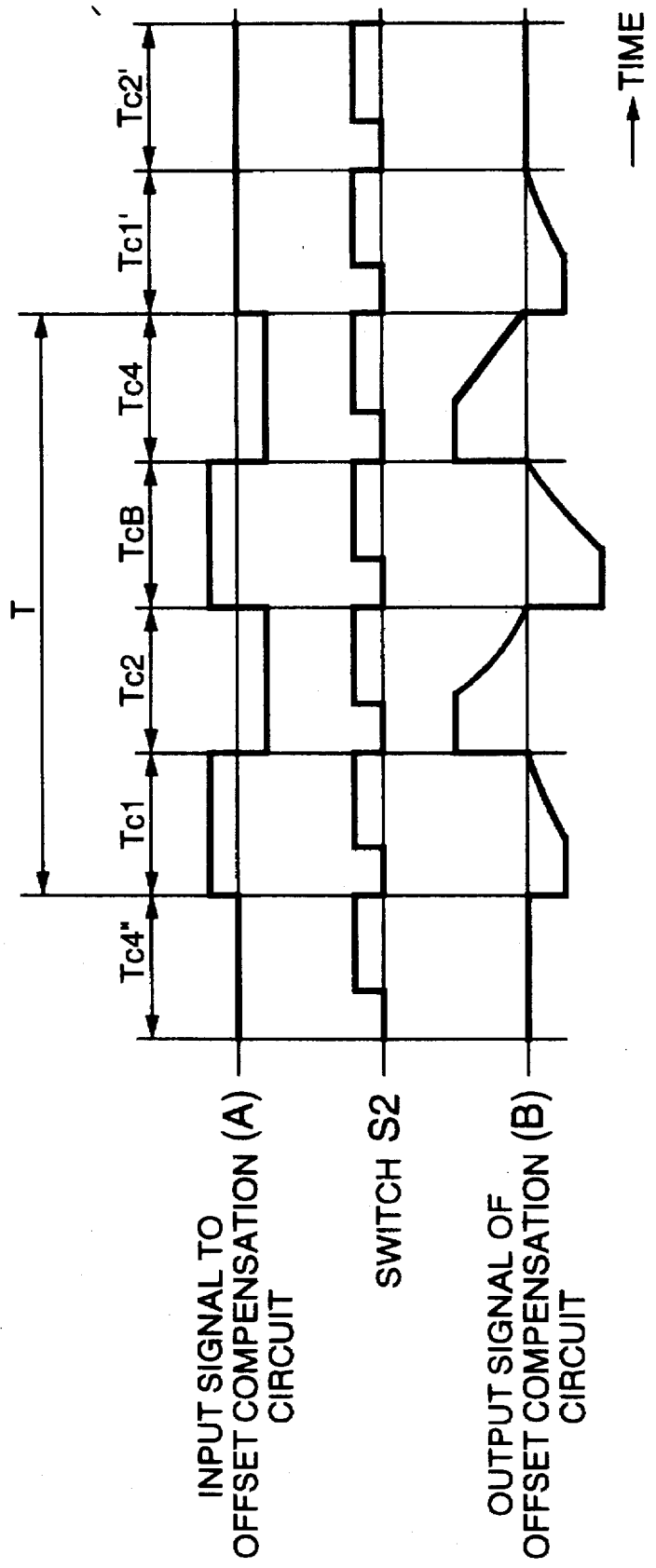
FIG. 13 is a waveform chart showing the operation timing of the electromagnetic flow meter illustrated in FIG. 10.

A first problem, due to the operation principle of the offset compensation circuit, will be explained below with reference to FIG. 13.

The offset compensation circuit operates on the assumption that a square-wave signal is continuously inputted thereto. When the offset compensation circuit is supplied with the square-wave signal only during two cycles $Tc_1$–$Tc_4$ as illustrated in FIG. 13-(A), it generates a half output during the period $Tc_1$ and also generates a half output even during a period $Tc'_1$ in which no input signal is supplied thereto, as illustrated in FIG. 13-(B).

With this respect, the basic operation of the offset compensation circuit centered on the period $Tc_2$ is to add the input during the period $Tc_2$ and the input during the previous period $Tc_1$ by a feedback operation of an integrator (such as 52 in FIG. 6) with opposite polarities to each other to remove a DC offset voltage.

Therefore, since no input signal is supplied to the offset compensation circuit in a period $Tc''_4$ previous to the period $Tc_1$, the offset compensation circuit generates an output in the period $Tc_1$ which is one half of the output in the periods $Tc_2$, $Tc_3$. In addition, since an input of the period $Tc_4$ is added with the negative polarity in the period $Tc'_1$ in which no input signal is supplied to the offset compensation circuit, a half output is also generated in the period $Tc'_1$.

Figure 3:
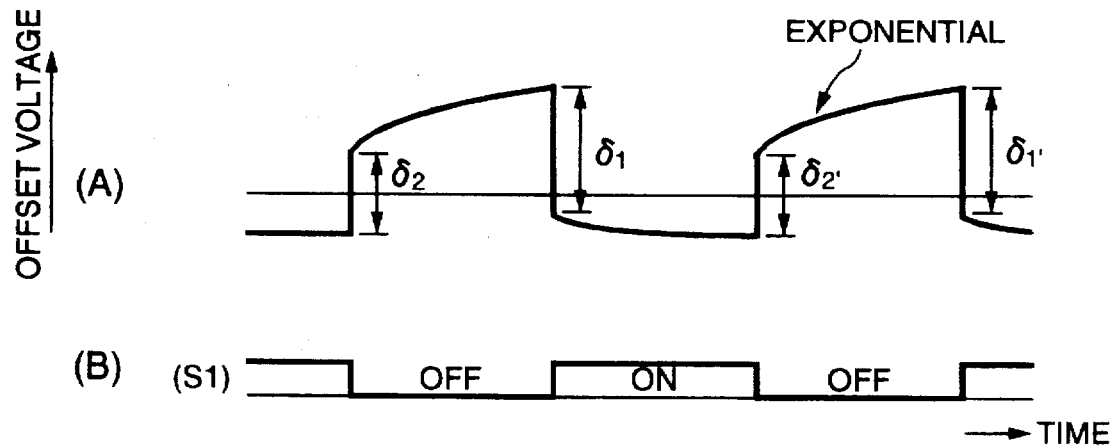
FIG. 3 is a waveform chart showing the relationship between an offset voltage (A) and on/off states of the short-circuit switch of the electromagnetic flow meter illustrated in FIG. 1.
Figure 4:
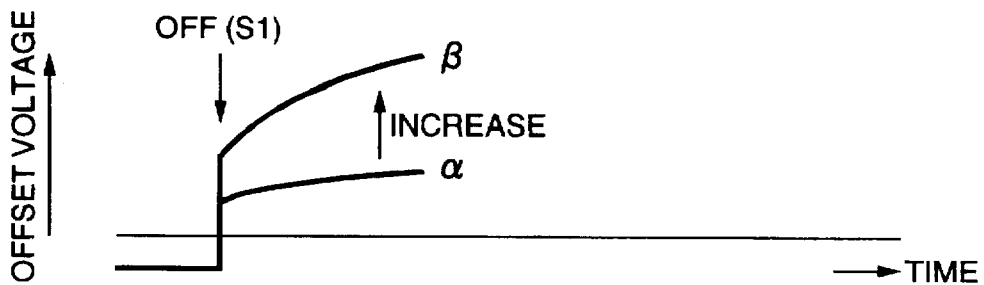
FIG. 4 is a waveform chart illustrating DC offset voltage fluctuation.
Figure 5:
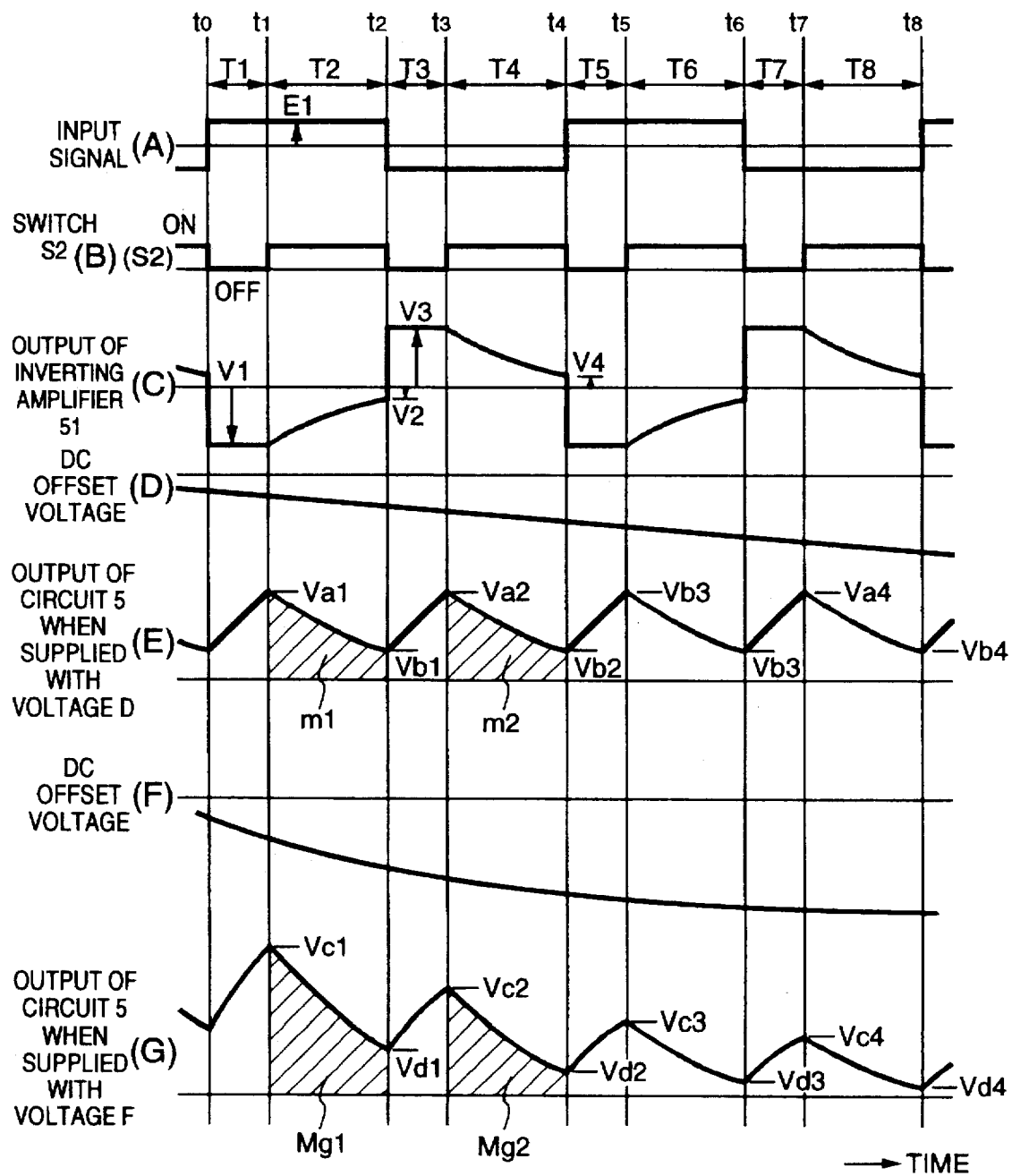
FIG. 5 is a waveform chart showing the operation timing of the electromagnetic flow meter illustrated in FIG. 1.

As a second problem associated with the "DC offset voltage fluctuation" accompanied by the on/off operation of the short-circuit switch S1, the level difference δ2 produced when the short-circuit switch S1 is turned off and the level difference δ2' produced when the short-circuit switch S1 is turned off at the next time are not completely the same, as the prior art example illustrated in FIG. 3-(B). Thus, each time the short-circuit switch S1 is turned off, a least difference is found in the level difference.

Due to such least difference, the correction relying on the subtraction, implemented in the embodiment of FIG. 6, cannot completely remove the DC offset voltage fluctuation.

Figure 10:
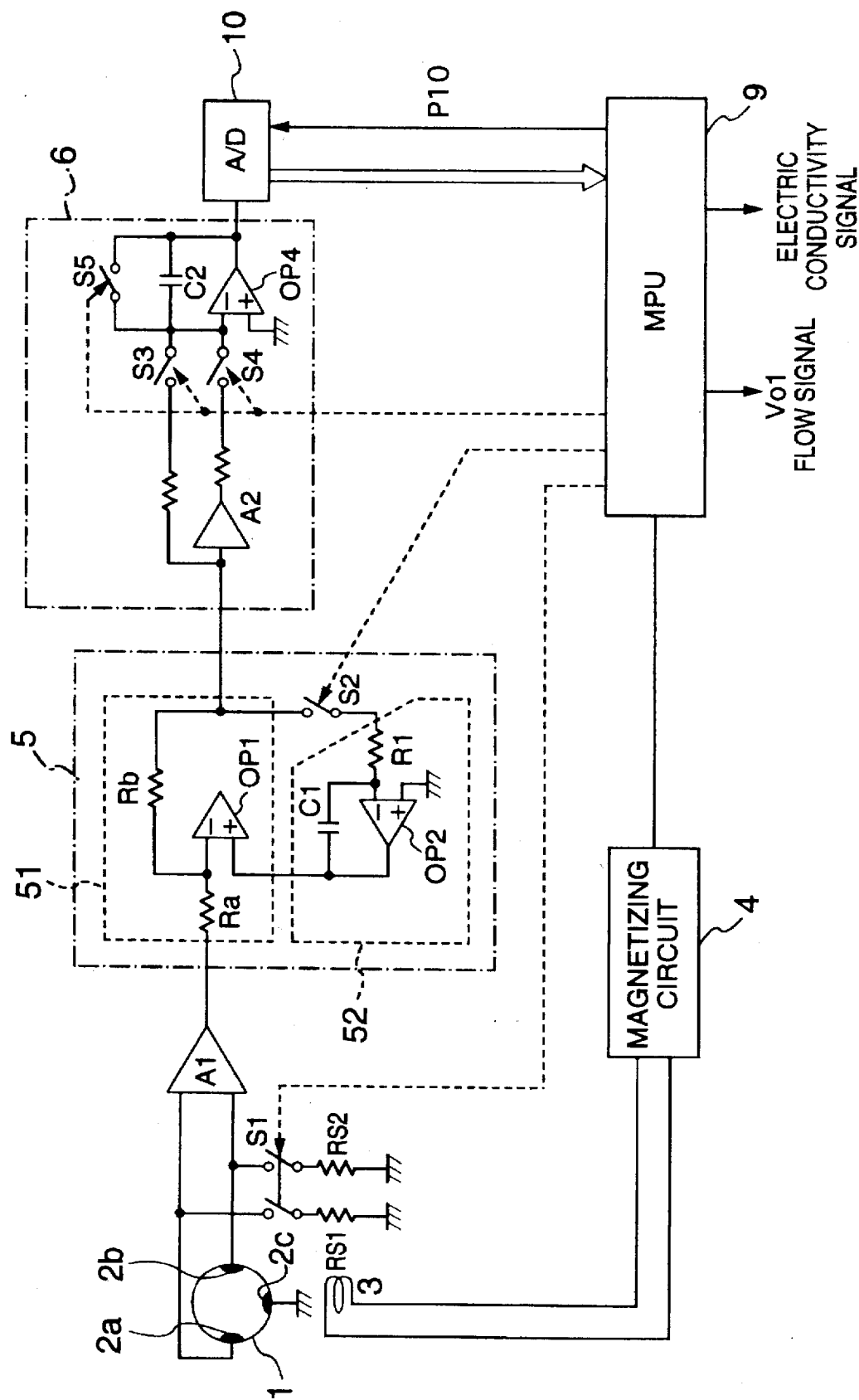
FIG. 10 is a block diagram illustrating an electromagnetic flow meter according to another embodiment of the present invention.
Figure 11:
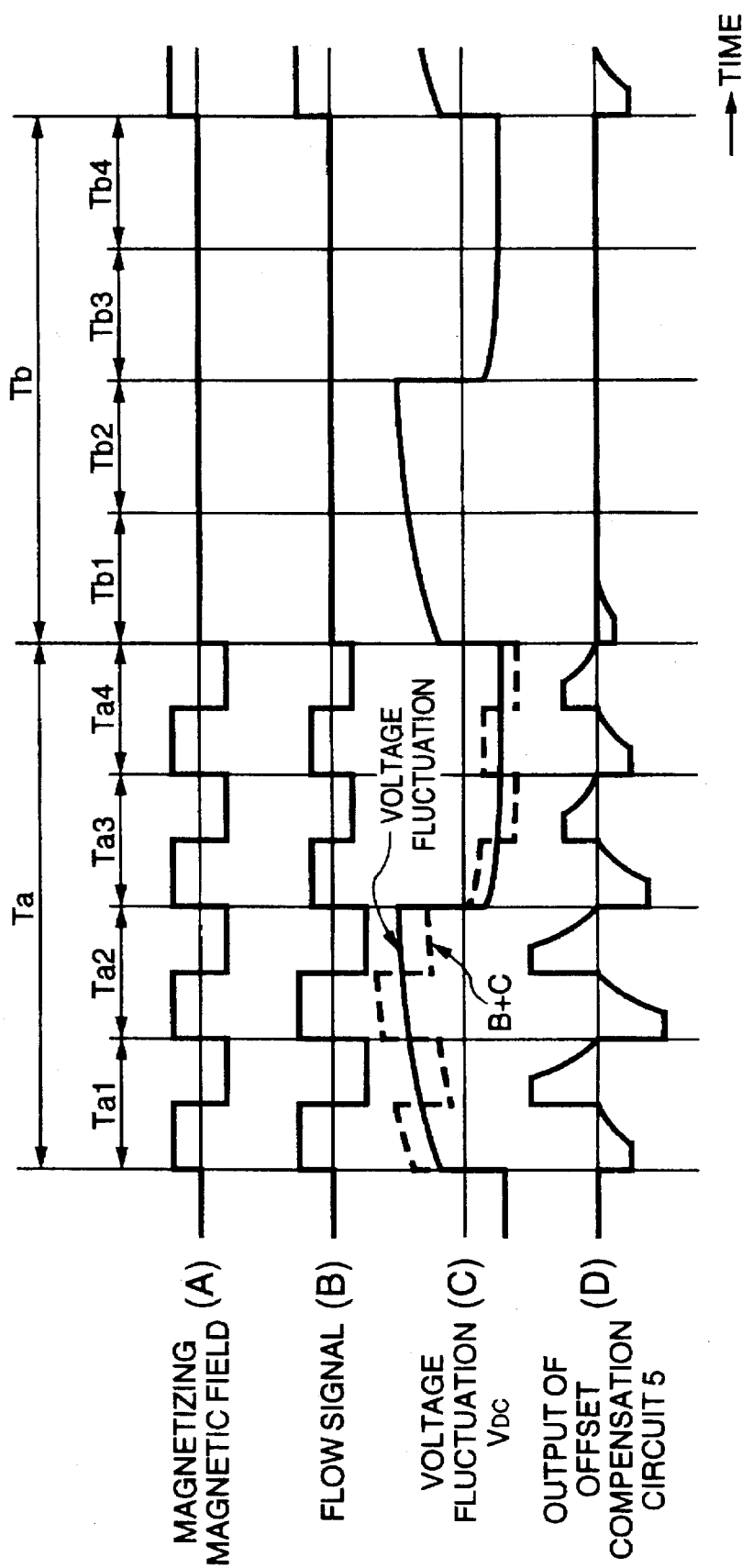
FIG. 11 is a waveform chart showing the operation timing of the electromagnetic flow meter illustrated in FIG. 10.
Figure 12:
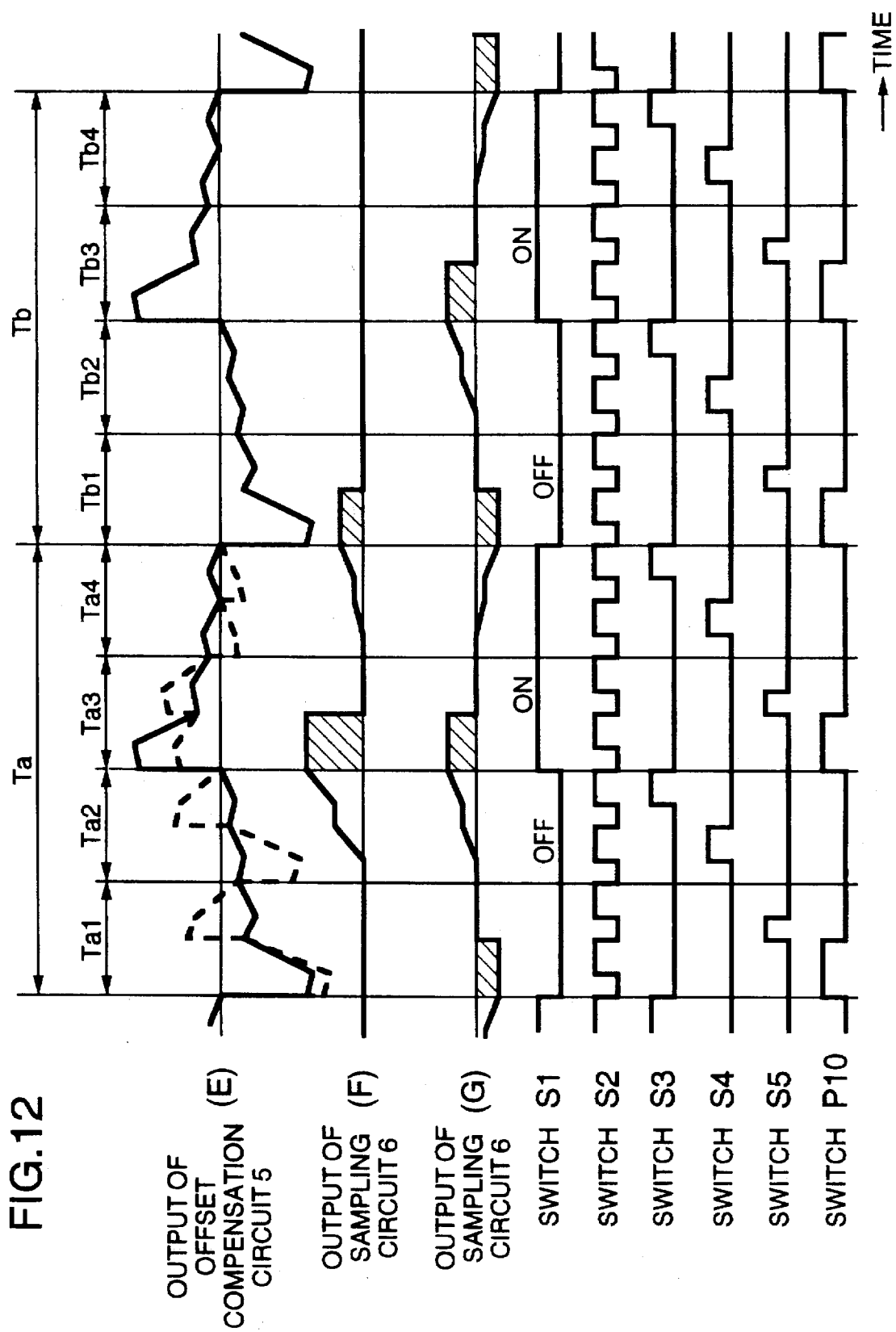
FIG. 12 is a waveform chart showing the operation timing of the electromagnetic flow meter illustrated in FIG. 10.

An embodiment illustrated in FIGS. 10–12 is a practical one which can solve the two problems left unsolved in the embodiment of FIGS. 6–9, i.e., the problem due to the operation principle of the offset compensation circuit and the problem of the "DC offset voltage fluctuation" which varies every time the short-circuit switch is turned off. FIG. 10 illustrates an electric circuit diagram of an electromagnetic flow meter according to this embodiment, and FIGS. 11–12 are waveform charts representing the operations of components in the electromagnetic flow meter.

Since the basic configuration and operation of this embodiment is the same as those of the foregoing embodiment described with reference to FIGS. 6–9, different portions will be mainly explained.

FIG. 11-(A) illustrates a magnetic field produced by a magnetizing square wave, wherein a magnetization period Ta consists of magnetization cycles Ta1, Ta2 in which a short-circuit switch S1 is off and magnetization cycles Ta3, Ta4 in which the short-circuit switch S1 is on, i.e., a total of four cycles, as illustrated in FIG. 12. A subsequent non-magnetization period Tb has the same length as the magnetization period Ta and consists of cycles Tb1, Tb2 in which the short-circuit switch S1 is off and cycles Tb3, Tb4 in which the short-circuit switch S1 is on, i.e., a total of four cycles. A full cycle of measuring operations consists of the magnetization period Ta and the non-magnetization period Tb. FIG. 11-(B) illustrates a flow signal generated when the magnetic field of FIG. 11-(A) is applied. A solid line in FIG. 11-(C) shows a waveform representing "DC offset voltage fluctuation" which occurs when the short-circuit switch S1 is turned on and off. A broken line in the period Ta shows a waveform representing the "DC offset voltage fluctuation" multiplexed with the flow signal. FIGS. 11-(A), 11-(B), 11-(C) correspond to FIGS. 7-(A), 7-(B), 7(C), respectively, and have the same waveforms as those figures.

FIG. 11-(D) illustrates an output waveform of an offset compensation circuit 5 in FIG. 10 when the input illustrated in FIG. 11-(B) is supplied thereto. While FIG. 11-(D) corresponds to FIG. 7-(D), FIG. 11-(D) represents the characteristic of the offset compensation circuit with the input signal starting from a zero level, so that the output value in the former half of the period Ta1 is one half of the output value in the former half of the period Ta2. Also, the output value in the former half of the period Ta3 is larger than the output value in the former half of the period Ta4. Although no input is supplied during the former half of the period Tb1, one half of the output generated in the period Ta4 is present in the former half of the period Tb1.

The reason for the foregoing operation has been previously explained with reference to FIG. 13. An off-period and an on-period of the short-circuit switch S1 respectively include the two cycles Ta1, Ta2 and the two cycles Ta3, Ta4 in the magnetization period Ta, and also include the two cycles Tb1, Tb2 and the two cycles Tb3, Tb4 also in the non-magnetization period Tb, respectively, so that even if output waveforms different from ideal ones are generated in the former halves of the cycles Ta1, Ta3, Tb1, Tb3, ideal outputs are generated in the second cycles Ta2, Ta4, Tb2, Tb4.

FIG. 12-(E) illustrates an output waveform of the offset compensation circuit 5 when the DC offset voltage fluctuation illustrated in FIG. 11-(C) is inputted thereto, wherein a solid line represents the output waveform when only the "DC offset fluctuation" is inputted, and a broken line represents the output waveform when the "DC offset fluctuation" multiplexed with the flow signal voltage is inputted, similarly to the case of FIGS. 7, 8.

FIG. 12-(F) illustrates a waveform generated when the flow output of FIG. 11-(D) is sampled by a sampling circuit 6 in FIG. 10 at the timing of switches S4, S3 illustrated in FIG. 12.

While the operation of the sampling circuit 6 is similar to that described with reference to FIGS. 7–9, the sampling circuit 6 neglects the flow output of the first cycles immediately after the short-circuit switch S1 is turned on and off, and samples the flow output of the second cycles Ta2, Ta4 to generate a sampled value Es1 in the period Ta2 and a sampled value $Es_2$ in the period Ta4.

Similarly, FIG. 12-(G) illustrates a waveform generated when the output of the offset compensation circuit 5 supplied only with the "DC offset voltage fluctuation" represented by the solid line in FIG. 12-(E) is sampled by the sampling circuit 6 at the timing of switches S4, S3, where sampled values $E_Dc1$ and $E_Dc2$ are generated in the periods Ta2, Ta4, respectively.

Also in the non-magnetization period Tb, the sampling circuit 6 neglects the flow output of the first cycles immediately after the short-circuit switch S1 is turned on and off, and samples the flow output of the second cycles Tb2, Tb4 to generate sampled values $E_Dc1$, $E_Dc2$ in the periods Tb2, Tb4, identical to the sampled values in the period Ta2, Ta4, respectively.

In the embodiment illustrated in FIG. 10, the held values Es1, $Es_2$ and $E_Dc1$, $E_Dc2$, indicated by hatched portions in FIG. 12-(F) and FIG. 12-(G) are analog-to-digital (A/D) converted by an A/D convertor 10 which is operated at the timing of an A/D conversion control signal P10. Then, the A/D converted values are fetched in MPU 9.

The MPU 9 internally performs the following calculations:

$$Vo_1 = (Es_1 + E_Dc1) - E_Dc1 = Es_1$$

$$Vo_2 = (Es_2 + E_Dc2) - E_Dc2 = Es_2$$

wherein $Es_1 + E_Dc1$ is an output in the period Ta2, $E_Dc1$ an output in the period Tb2, $Es_2 + E_Dc2$ an output in the period Ta4, and $E_Dc2$ an output in the period Tb4.

In the above equations, $Vo_1$ is an output signal proportional to the flow rate, and $Vo_2$ is a value measured when the short-circuit switch S1 is on, i.e., when the pre-amplifier A1 presents a low input impedance, and serves as information for calculating the electric conductivity of a fluid under measurement. The MPU 9 calculates the electric conductivity of the fluid from the ratio of $Vo_2$ to $Vo_1$.

In the embodiment illustrated in FIGS. 10–12, the input signals in the first cycles immediately after the short-circuit switch S1 is turned on and off are not employed, and the input signals in the second cycles are sampled. Therefore, even if the level difference δ2 and the next level difference δ2' do not match completely as illustrated in FIG. 3-(B), the measurement is not affected by variations in the level difference.

Since the electromagnetic flow meter of the present invention is configured as described above, the electric conductivity of a fluid can be correctly measured even if the magnitude of "DC offset voltage fluctuation" due to the on/off operation of the short-circuit switch (S1) varies by the action of foreign substances attached on the electrodes or the like.

The present invention can also improve the accuracy of correcting the influence of changes in the electric conductivity of a fluid exerting on flow measurements.

Further, since the input signals in the first cycles immediately after the short-circuit switch S1 is turned on and off are not employed and the input signals in the second cycles are sampled, even if a level difference δ2 and the next level difference δ2' does not match completely as illustrated in FIG. 3-(B), the measurement is not affected by variations in the level difference.

I claim:

1. A electromagnetic flow meter comprising:
   a pair of electrodes positioned opposite to each other inside a pipe through which a fluid pass;

an earth electrode for grounding said pipe;

a short-circuit switch disposed between said pair of electrodes and said earth electrode for performing an on/off operation;

an amplifier for amplifying an electric signal from said pair of electrodes;

means for generating a first output as a flow signal when said short-circuit switch is turned off to operate said amplifier in a high input impedance state;

means for generating a second output when said short-circuit switch is turned on to operate said amplifier in a low input impedance state; and processing means for calculating the electric conductivity of said fluid based on the ratio of said first output to said second output, characterized by generating the outputs when said short-circuit switch is on and off in a magnetization state, generating the outputs when said short-circuit switch is on and off in a non-magnetization state, and subtracting the outputs in the non-magnetization state from the outputs in the magnetization state to remove the influence of fluctuation in DC offset voltage occurring to the accompaniment of an on/off operation of said short-circuit switch.

2. An electromagnetic flow meter according to claim 1, characterized in that a signal in one cycle after said short-circuit switch is turned on or off is not used, and a signal in the second cycle is sampled as an output signal.

* * * * *